March 27, 1962 — C. C. ALBRECHT — 3,026,520
POWER OPERATED C-RING CLINCHING TOOL
Filed Feb. 15, 1960 — 6 Sheets-Sheet 1

INVENTOR.
Clifford Charles Albrecht
BY
Clayton L. Jenkes
ATTORNEY

March 27, 1962 C. C. ALBRECHT 3,026,520
POWER OPERATED C-RING CLINCHING TOOL
Filed Feb. 15, 1960 6 Sheets-Sheet 2
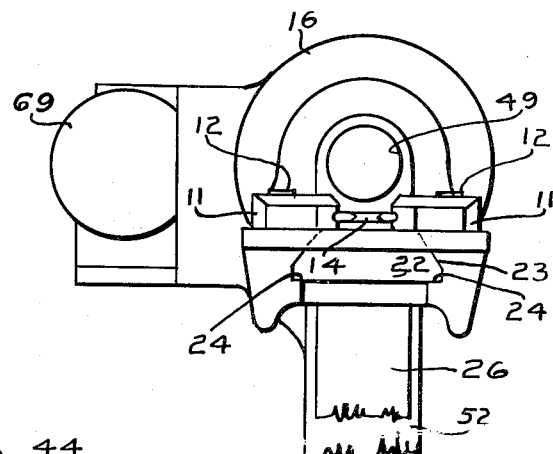
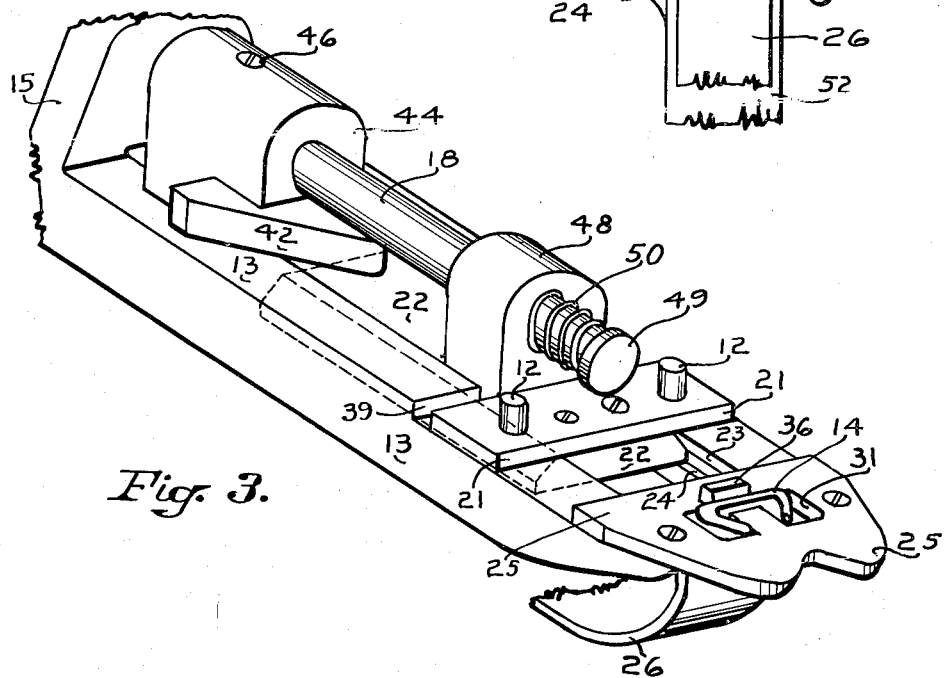
INVENTOR.
Clifford Charles Albrecht
BY
Clayton L. Jenks
ATTORNEY

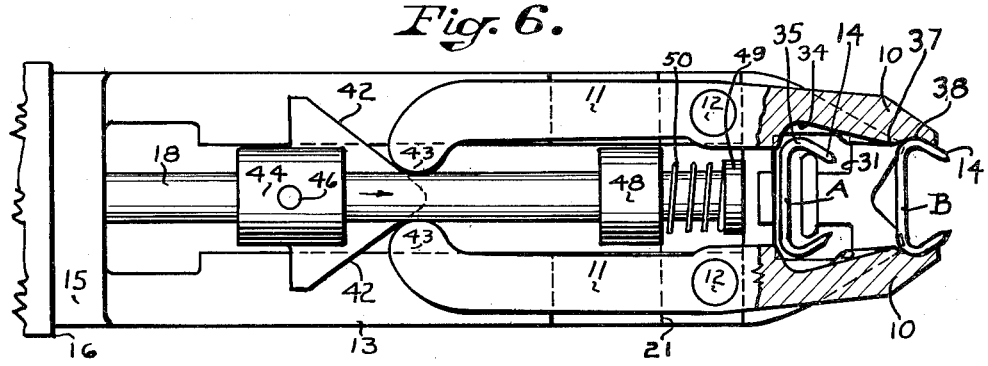
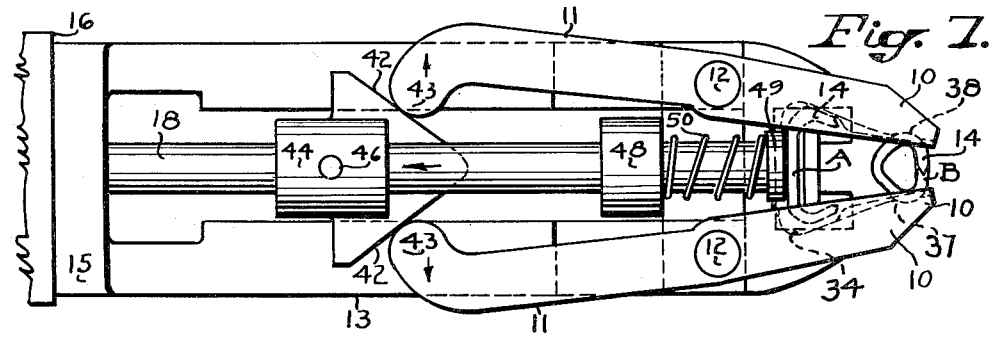
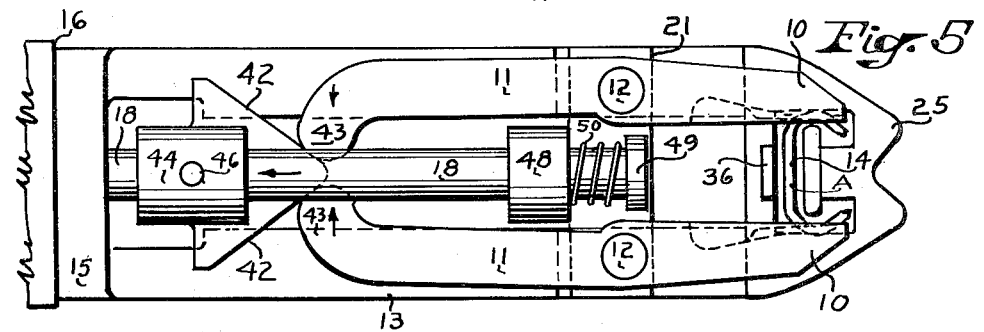
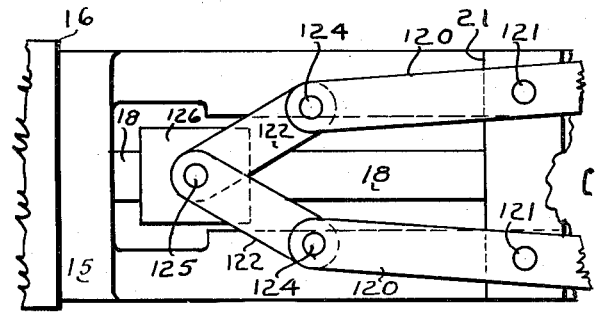
INVENTOR.
Clifford Charles Albrecht
BY
Clayton L. Jenks
ATTORNEY

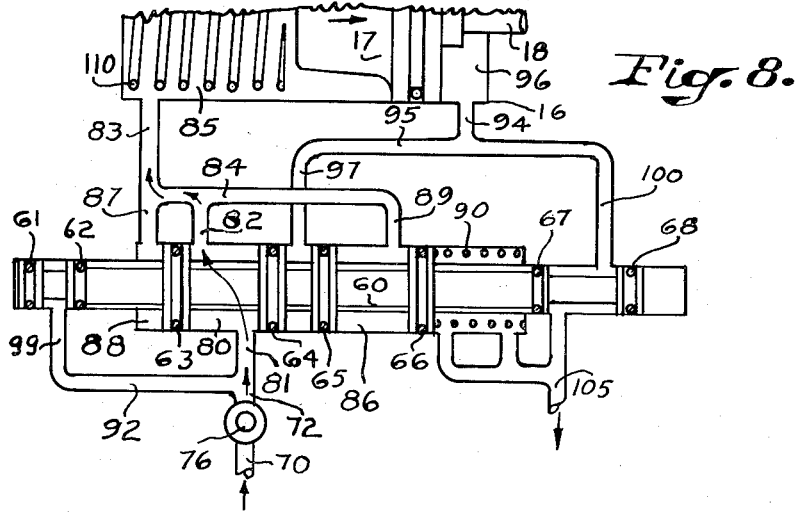
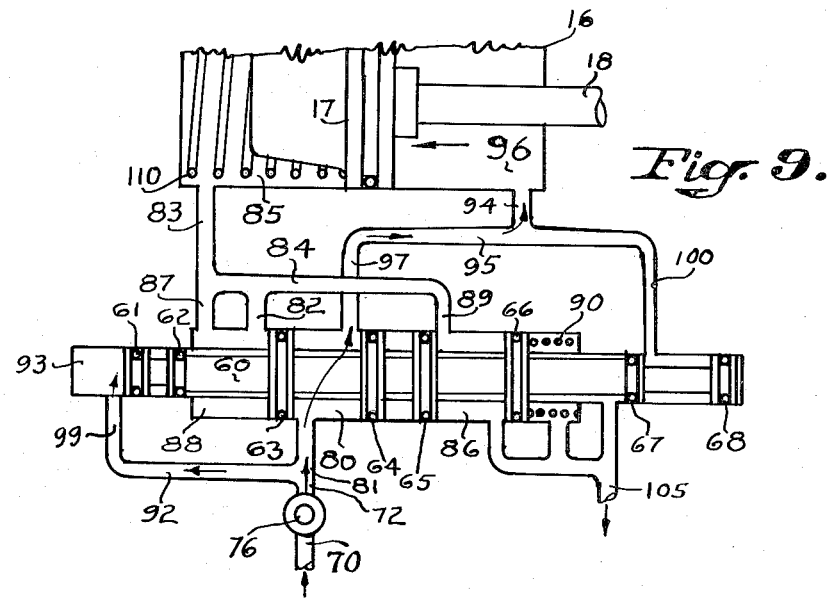
INVENTOR.
Clifford Charles Albrecht
BY
Clayton L. Jenks
ATTORNEY March 27, 1962
C. C. ALBRECHT
3,026,520
POWER OPERATED C-RING CLINCHING TOOL
Filed Feb. 15, 1960
6 Sheets-Sheet 5
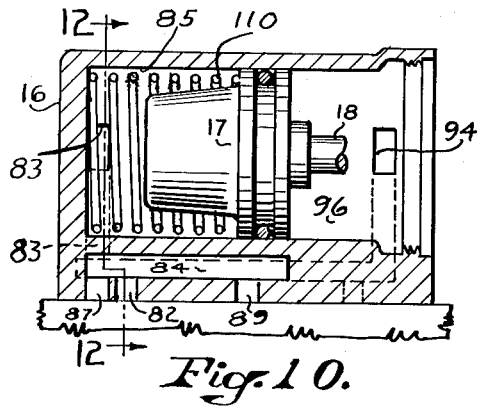
Fig. 10.
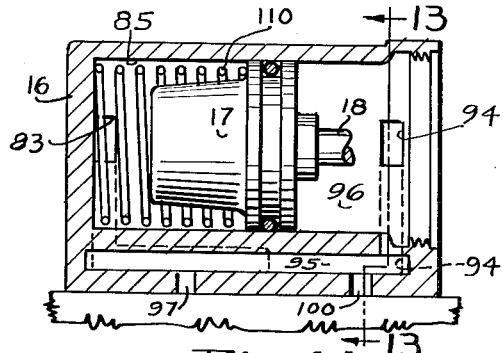
Fig. 11.
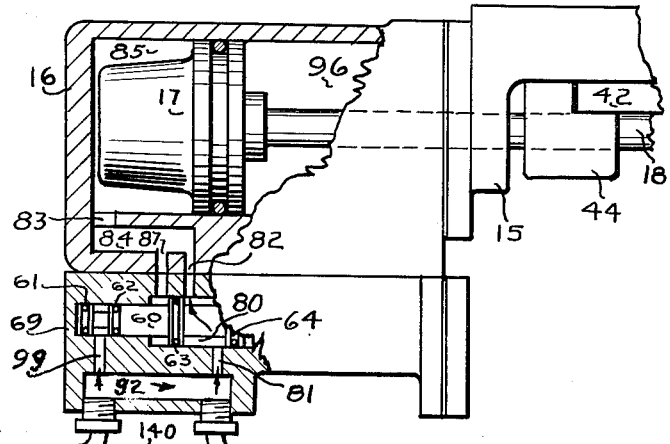
Fig. 14.
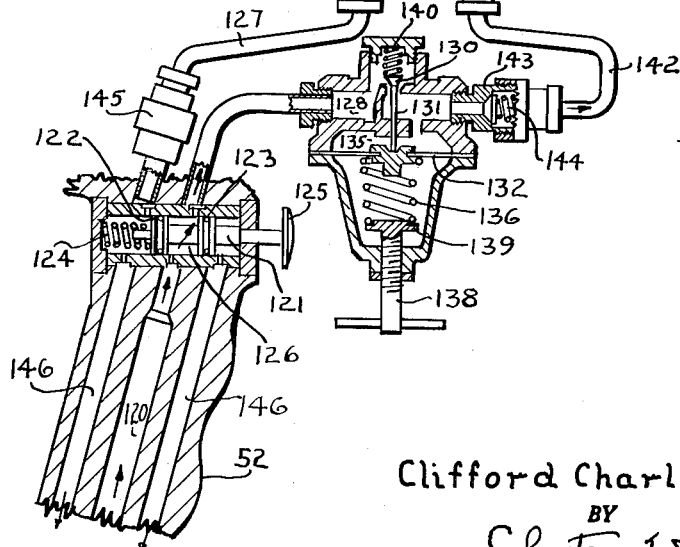
INVENTOR.
Clifford Charles Albrecht
BY
Clayton L. Jenks
ATTORNEY March 27, 1962 C. C. ALBRECHT 3,026,520
POWER OPERATED C-RING CLINCHING TOOL
Filed Feb. 15, 1960 6 Sheets-Sheet 6
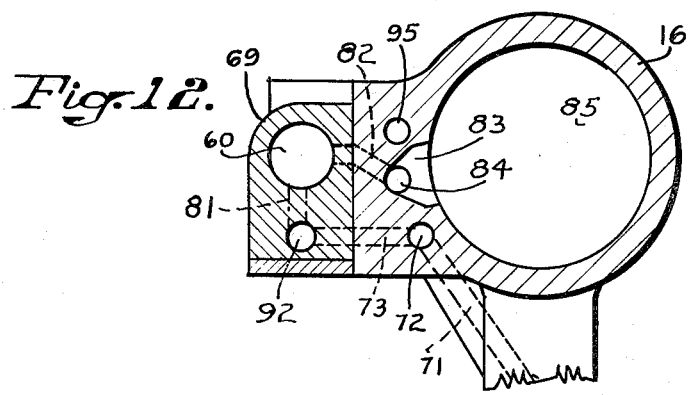
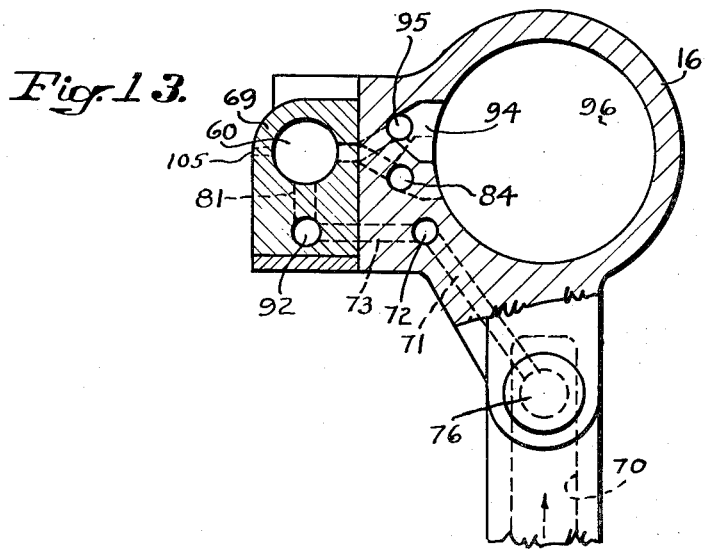
INVENTOR.
Clifford Charles Albrecht
BY
ATTORNEY

United States Patent Office 3,026,520
Patented Mar. 27, 1962

3,026,520
POWER OPERATED C-RING CLINCHING TOOL
Clifford Charles Albrecht, Leicester, Mass., assignor to Novelty Tool Company, Inc., Spencer, Mass., a corporation of Massachusetts
Filed Feb. 15, 1960, Ser. No. 8,843
17 Claims. (Cl. 1—187)

This invention relates to a power operated C-ring clinching tool, and more particularly to a tool having ring clinching jaws to which the C-rings are automatically fed from an associated magazine.

This type of tool is customarily used for securing fabric to the wire frame of an automobile seat or other part, as well as for fastening together many other types of articles. A standard power tool construction has comprised a pneumatically operated piston connected to move a pair of pivoted ring clinching jaws and usually in association with a pusher operating in a timed relation with the jaws which is arranged to feed a ring from a magazine supply to the jaws when they are in a non-clinching position. One problem is that of providing a tool which makes it impossible for a second ring to be fed down against the one already held in the jaws and thus causes a jamming of the tool which renders it inoperative. In some constructions, the operator often finds that the time is too short within which he may remove the tool from a given location relative to the fabric being attached to the frame before another ring is fed into the jaws with a consequent interference.

It is a primary object of this invention to overcome such problems and provide a pneumatically operated tool which is light in weight, has a small number of operating parts, and is comparatively trouble free and long lived in its operating characteristics.

A primary object is to prevent jamming the tool by feeding a second ring into a position of interfering with the ring in the clinching jaws.

Another object is to feed a ring from the magazine to the jaws and hold the ring in a work engaging position while the tool is normally idle.

A further object is to provide a mechanically operated piston mechanism which moves a pair of jaws from a ring receiving position to one where the C-ring is presented for engaging a workpiece and is there held under a yielding but firm pressure which insures that the ring may be inserted into the work positively and accurately under the operator's control.

Another object is to provide a tool of this type in which, upon the application of power, a ring in the jaws is first clinched and the jaws then returned automatically to a ring receiving position, and upon the release of the power the jaws move forward with another ring to a work applying position.

A still further object is to provide a tool having longitudinally reciprocable jaws which are moved automatically to a clinching end position by movement of a piston to an intermediate point, after which the application of fluid pressure requires only a further short and rapid movement of the piston to clinch the ring.

Another object is to provide a tool of this type in which the jaws are moved by the application of power through the cycle of first clinching a ring and then returning to receive a second ring and which comprises a supplementary power mechanism acting upon the release of the power to move a ring automatically to the clinching position and remains there while the tool is idle.

A further object is to provide a tool of this type in which each ring is clinched automatically under the same maximum power pressure on the piston irrespective of variations in the ring shape and size.

A further object is to provide a tool of this type having jaws reciprocable between ring receiving and clinching positions in which the jaws when first retracted are yieldingly and readily separated from the clinched ring without disturbing the work.

In accordance with this invention, I have provided a pneumatically operated tool having pivoted jaws mounted for a longitudinal movement between ring receiving and clinching positions which positively transport one C-ring at a time and then close or clinch it before returning to pick up another ring presented by a magazine. The jaws are moved pivotally by a fluid pressure operated piston and preferably through the intermediary of a cam, and the longitudinal movement is effected by the piston being connected to move the jaw support. The fluid pressure to move the piston to close a ring is governed by a control valve mechanism so arranged that the fluid pressure moves the piston in opposite directions, first to clinch a ring and then return to an initial position. Thereafter, the jaws receive a new ring and transport it under adequate but a yielding non-clinching pressure to a working position while the tool is otherwise idle with the power cut off. This ring transportation is best accomplished by the supplemental force of a spring arranged to move the piston forward to a stop, but this may be done by a reduced fluid pressure controlled to move the jaws longitudinally without enough force to clinch the ring. The piston movement is preferably controlled by an automatic reversing valve mechanism which operates while the fluid pressure supply is maintained by means of a manually operated primary valve.

Referring to the drawings illustrating preferred embodiments of the invention:

FIG. 3 is a perspective view, with parts broken away or removed, which shows the jaw supporting slide moved by a cam;

FIG. 4 is the fragmentary elevation of the front end of the tool, showing the relationship of the piston rodhead and the jaws;

FIG. 5 is a plan view, partly broken away, of the front end of the tool with the jaws positioned as moving rearwardly and dragging over a ring to locate it at the front end of the jaws in a clinching position;

FIG. 6 is a similar fragmentary view indicating the two end positions of feeding a C-ring;

FIG. 7 is a similar view showing the locations of the parts at the end of ring clinching step;

FIGS. 8 and 9 are diagrammatic views showing the control valve operation;

FIGS. 10 and 11 are fragmentary longitudinal sections of the piston casing showing the two sets of fluid passages;

FIG. 12 is a fragmentary transverse section of the piston and valve casings taken on the line 12—12 of FIG. 10, showing the arrangement of the valve passages to the left hand side of the piston;

FIG. 13 is a similar view taken on the line 13—13 of FIG. 11;

Figure 1:
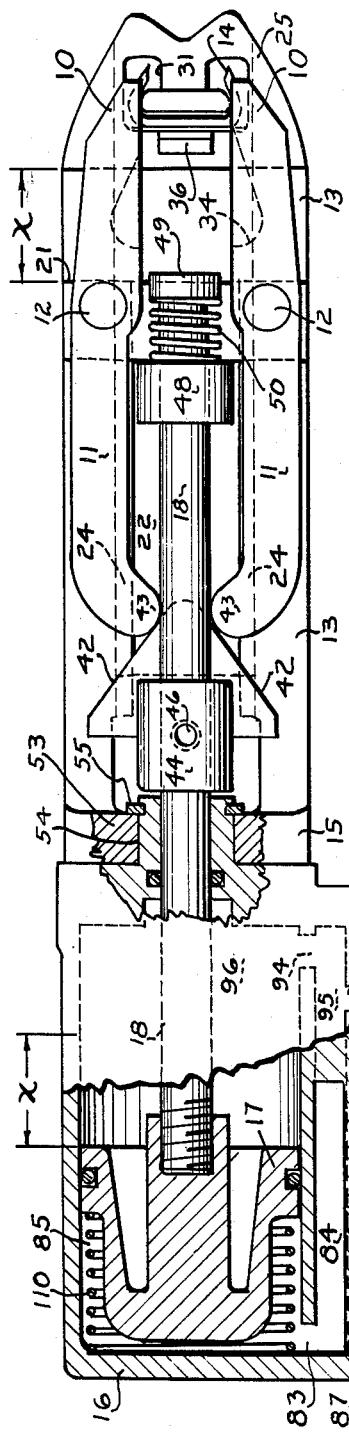
FIG. 1 is a plan view partly in section, showing the piston moved jaws and the control valve positioned for moving the jaws backward.
Figure 2:
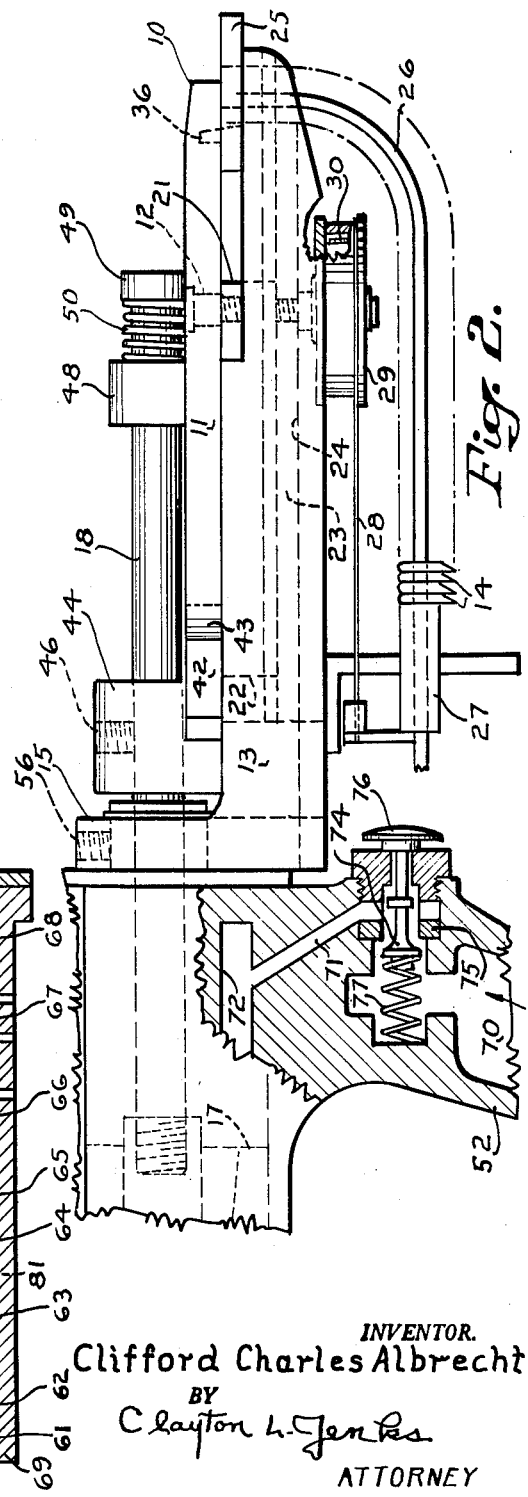
FIG. 2 is a side elevation, partly broken away, of the structure of FIG. 1.

FIG. 14 is a fragmentary sectional view of a modification showing the piston chamber, the reversible valve and control valve for introducing fluid to move the piston forward and an associated pressure reducing valve which causes the piston to move the C-ring forward only to a clinching position; and FIG. 15 is a fragmentary detail of a further modification showing a toggle joint for operating the jaws.

Referring first to FIGS. 1 to 4 inclusive, the power tool comprises a pair of jaws 10 formed on the ends of levers 11 of the first-class pivoted centrally on pins 12 carried by the two arms of a longitudinally extended bifurcated frame 13. The levers are so mounted that they may be reciprocated longitudinally as well as pivotally turned for positioning and clinching a C-ring 14. The rear solid portion of the frame has an upstanding lug 15 pivotally mounted, as hereinafter explained, on the front end of a piston casing 16 within which a piston 17 is reciprocably mounted. Fluid under pressure is introduced alternately to opposite sides of the piston to reciprocate the same. The piston rod 18 threaded into the piston passes slidably through the front end of the piston casing and is connected both to reciprocate the jaw pivots and to swing the jaw levers as will be explained. The jaws are preferably supported by the two spaced pivots 12 carried on a transverse plate 21, as best shown in FIG. 3. This plate 21 is in turn mounted, as by screws, on the top of a dove-tail shaped slide 22 movably mounted between overhanging and interfitting slideways 23 on the two arms of the frame and supported by the horizontal spaced shoulders 24. That slide is reciprocated by means of the piston rod 18.

Straddling the front ends of the two spaced arms of the frame 13 is a magazine plate 25 suitably attached thereto, as by means of screws. Removal of this plate and associated parts permits assembling the slide 22 within its runway by inserting it into the open space between the frame arms. A long C-ring slideway plate 26 has one end perpendicular and suitably secured to the plate 25, such as by welding. This slideway, shaped to fit between the arms of the C-rings, serves as a magazine supply for a set of rings slidably mounted thereon. It is usually curved as shown so as to extend lengthwise of the frame. This magazine may be of suitable construction and is shown as comprising a slide member 27 (FIG. 2) mounted on the slideway 26 and urged forward by means of a cord 28 attached at one end to the slide 27 and at its other end wound around and attached to a drum 29 rotatably urged by a spiral clock spring 30 to draw the slide forward and move the set of rings along the magazine plate. A supply of C-rings is suitably mounted on the plate, as by removing the slide 27 and feeding the rings over the free end of the plate 26. This magazine serves to present the rings one at a time to the opening 31 within the jaw plate 25 which is shaped to position the end ring between the jaws 10.

A primary feature of this construction resides in having the pivoted jaws 10 move longitudinally of the frame 13 to carry a ring from the receiving position of FIG. 1 to the clinching position of FIG. 7. Hence, the jaws are mounted on the slide 22, and the latter is moved by piston 17 through the required distance. Since the end ring of the magazine is located in the fixed position determined by the slot 31, the jaws 10 are required both to grip or seize that end ring and to carry it forward and present it in position in front of the magazine plate 25 and the front end of the frame 13 where the forwardly projecting pointed arms of the ring may be forcibly inserted into the work, after which the jaws are pivoted about pins 12 to clinch the ring therein.

Referring first to the provision for gripping the end ring and moving it forward, and primarily to FIGS. 1, 5, 6, and 7, the construction is such that the end ring 14 of the magazine supply is located next to the opening 31 in the magazine plate 25. It is fed to the jaws 10 by the cord 28 and associated spring 30 (FIG. 2) when the jaws are in the ring receiving position illustrated in FIG. 1. The two jaws 10 have similar open sided inwardly facing runway slots or grooves 34 so shaped that the end curved portion 35 (FIG. 6) of the ring may slide therein. When seized by the jaws, the end ring is moved forward from position A to position B (FIG. 6) as the jaw is moved from the ring receiving position of FIG. 5 to the clinching position B of FIG. 6 and FIG. 7. The jaws first retreat to the left and the slots 34 drag over the ring which is restrained from movement towards the left by the upstanding lug 36 on the plate 25 (FIGS. 3 and 6). When the end ring is picked off the magazine supply by the jaws moving to the right and carried to position B another ring (position A) takes its place in slot 31 as indicated in FIG. 6. This second ring engages the under sides of the jaws in grooves 34 which are so located and spaced that the ring is position A is not clinched by the jaw movement of FIG. 7.

The forward portion of each runway groove of the jaw 10 is provided with a shoulder or hump 37 which separates the rear portion 34 of the ring runway from a forward grooved portion 38 shaped to fit the round part 35 of the ring. That shoulder 37 engages the back portion of the ring and prevents its being moved backward within the jaws during the act of clinching the ring. That is, when the jaws move towards the left, the shoulder 37 is dragged over the ring part 35 until the latter is positioned on the front side of the shoulder 37 where it may be inserted into the work. The ring in position A rests against lug 36 and cannot move toward the left. FIG. 6 shows the arms of the ring projecting outwardly beyond the end of the tool where they are then bent into a closed formation as shown in FIG. 6, the final shape depending upon the initial shape of the ring as well as the related shape of the jaw grooves that have been suitably coordinated. The cross slide 21 is moved rearwardly by the air pressure until it strikes the stop shoulder 39 on the frame (see FIG. 3) and its forward movement is limited by the rear face of plate 25.

Of the various usable mechanisms which may serve both to rotate the jaws about their pivots and to move the jaws longitudinally of the frame, I prefer a cam cooperating with followers on the jaw levers. The cam mechanism shown in FIGS. 1 to 7 is moved by the piston and it serves the double function of both moving the jaws longitudinally and rotating them to grip and finally to close the ring. The structure there shown comprises a wedge-shaped cam 42 which is moved positively by the piston rod 18. This cam wedge has its apex pointing forward and its inclined faces riding against the inwardly turned ends 43 of the levers 11 serving as cam followers. The cam is so shaped relative to the levers and followers that the required forward motion will swing the levers from the position of FIG. 6 to that of FIG. 7. The wedge block 42 (FIG. 3) is suitably mounted on the under side of a block 44. This block 44 has a central hole within which the piston rod 18 is fitted and the two parts are held together by means of a suitable screw 46 so that the cam wedge moves with the piston.

The parts are so constructed that the first forward motion of the cam serves to clamp the jaws onto a ring (FIG. 1) and then the jaws travel towards the right to present the ring to the work. To this end, the slide 22 has an upstanding lug 48 at the rear of the cross piece 21 which is provided with a central hole through which the piston rod 18 freely slides. The end of the piston rod has an enlarged head 49 suitably fixed thereon, and a helical coiled compression spring 50 is located on the piston rod between the collar 49 and the lug 48 of the slide. Hence, the rod 18 may move forward without affecting the slide, but on the return motion of the piston the piston head 49 and spring 50 carries the slide back. This rearward motion of the slide carries the jaws to the left and they drag over the top ring in the magazine (position A, FIG. 4) and in so doing the hump or shoulder 37 (FIG. 6) in the groove 34 goes over the ring and causes the ring to become seated in front of the shoulder, so that the latter then serves as a back stop to resist movement of the ring towards the left when thrust into the work. On the forward motion of the piston rod 18 and wedge block 42 towards the right, the first effect is for the cam 42 to move between and separate the arms of the levers 11 somewhat. This causes the jaws to clamp tightly against the end ring 14 in the magazine. This clamping pressure holds the ring in the grooves or recesses 38 of the jaws and there is no further rotary movement of the jaws for the moment. Since the slide 22 and its lug 48 are connected to the lever arms only through the pivot pins 12, the next effect of forward movement of the wedge block is to shove forward on those pins 12 and carry the slide therewith. This moves the C-ring 14 from position A to position B in FIG. 6 where the pointed arms of the C-ring project outwardly and may now be inserted in the work. The forward movement is stopped when the cross plate 21 strikes the magazine plate 25 (FIG. 3). Thereafter, since the jaw pivots 12 are stationary, any further movement of the cam 42 pries the cam follower ends 43 of the jaw levers 11 apart, and this action is such as to clinch the ring 14 into the condition shown in FIG. 7. In this forward movement, the head 49 of the piston moves over the jaws without interference (FIG. 4).

After the C-ring has been clinched, the next step is to move the jaw levers rearwardly and disconnect them from the clinched ring in the work so that they may return to the initial position for receiving the next end ring of the magazine pile. As indicated in FIG. 7, the inturned end of each jaw at the front portion of the recess 38 is in front of the clinched ring and a rearward movement of the jaws causes the jaws to separate enough to get free from the clinched ring. As the jaws move rearwardly (to the left), as shown in FIGS. 5 and 7, this causes the new ring, riding in grooves 34 of the jaws, to climb over the humps 37 into the forward seats 38 (FIG. 1). The ring cannot move towards the left because of the stop 36 so that the lever jaws move relative to the stationary ring. This rearward motion of the jaw levers is effected by the enlarged head 49 on the end of the piston rod 18 moving to the left and operating through the compression spring 50 engaging head 49 on the piston rod to move the lug 48 and the slide 22 rearwardly to the initial starting position. This spring yields to let the jaws swing outwardly and permit the ring to move over the hump 37 and become seated at 38. The rearward motion of the cross slide 21 is stopped by the shoulder 39 on the frame (FIG. 3).

In order that the C-ring in its outermost position (FIG. 6) may be presented at a desired angle to the work, the frame 13 is pivotally connected to the air cylinder casing 16 which is mounted on the handle 52. This connection (FIG. 1) comprises a boss projecting centrally from the front of the casing 16 and provided with an outer cylindrical bearing surface. The lug 15 projecting from the frame 13 has an inwardly projecting portion 53 bored to form an internal surface 54 rotatively fitting on the boss. A keyring 55 in a slot in the boss holds the parts together and permits rotation of the frame. For this, the set screw 56 is suitably loosened and the frame 13 and associated parts are revolved manually through a desired angle. This movement may also serve to revolve the ring magazine 26 from the under side position of FIGS. 2 and 3 to any other feasible location above or at the side of the frame.

The jaws and their associated slide on which they are pivoted are moved in both directions by means of a fluid pressure operated piston and a valve mechanism which controls that piston semi-automatically, subject only to the manual control of the operator. A preferred valve construction, illustrated particularly in FIGS. 1, 2, 10–13 and diagrammatically in FIGS. 8 and 9, comprises a valve stem 60 having thereon a set of pistons 61, 62, 63, 64, 65, 66, 67 and 68 slidably fitting within a suitably shaped casing 69 as indicated, which may be mounted on the side of the piston casing 16. Each piston is suitably sealed by O-rings or other desirable construction so as to control the passage of fluid under pressure. Fluid under pressure, such as compressed air derived from a suitable source, is admitted into the space 70 within the hollow handle 52 (FIG. 2) with which the operator manipulates the tool. That fluid is introduced through a suitable manually operated spring pressed valve into a conduit 72 (FIG. 2) which leads to the valve casing 69 (FIG. 1). The control valve comprises a movable valve 74 having a flange arranged to seat against a sealing ring 75 and prevent the flow of air. When moved inwardly by the button 76 against the force of the compression spring 77, the air passage is opened. Various other constructions may be used as desired to give the operator a full control of the air flow. In this construction, he holds the valve button 76 pressed inwardly until a ring has been clinched and the jaws have returned to pick up another ring.

The construction of the automatic valve 60 is best explained by reference to its operation, shown in FIGS. 8 and 9. However, details of the structure are shown in FIGS. 1, 2 and 10 to 13. The valve casing 69 is formed as a separate unit suitably secured on the side of the piston casing 16. Three parallel bores 72, 84 and 95 are formed in the casing 16, and have their ends suitably plugged. These are parallel with the bore 92 and the bore for the valve stem in casing 69. Air passes through the valve duct 70 to the passage 72 through an obliquely arranged passage 71 (FIGS. 2 and 13) suitably bored in the casing 16 and the handle 52. It communicates through a horizontal duct 73 (FIGS. 12 and 13) with the bore 92 in the valve casing 69 arranged below and axially parallel with the valve stem compartment. Parallel ducts 81 and 99 lead from the bore 92 to the valve spaces 93 and 80 as shown in FIGS. 8 and 9. The valve casing 69 has five lateral ducts 87, 82, 97, 89 and 100 leading to the chambers 84 and 95 in the piston casing 16, as will be described. The bore 84 in the piston casing 16 (FIG. 10) opens into the space 85 at the left hand side of the piston 17 through a lateral passage 83 (FIG. 12). The bore 95 (FIGS. 11 and 13) is parallel with the passages 72 and 84, and it delivers compressed air (FIG. 13) to the lateral duct suitably formed in the valve and piston casings where the air is transmitted to the space 96 at the right of the piston 17.

When air is admitted to the inlet conduit 72 it passes first to the compartment 80 (FIGS. 1 and 8) between the pistons 63 and 64. That is, the bored passage 72 (FIG. 2) connects with opening 81 (FIG. 1) leading to the compartment 80 when the valve system is in the position of either FIG. 8 or FIG. 9. At the start, as shown in FIG. 8, the air goes through the conduit 82 into the space 84 which is a bore in the piston casing parallel with the bore 72. This bore 84 opens into the compartment 85 (FIGS. 8 and 13) which is the space at the left of the tool operating piston 17, so that the first stage air pressure operation serves to push the piston 17 towards the right. It will be noted by reference to FIG. 8 that the passage 84 also communicates through a passage 89 with the closed space 86 between the pistons 65 and 66, which are of equal size and, therefore, remain balanced and do not affect the movement of the valve piston stem 60. The air pressure against the traveling piston is at first less than maximum because of the piston movement, but when the tool piston 17 reaches the end of its travel toward the right, the fluid pressure in piston space 85 and conduit 84 builds up to a maximum. Air under pressure has entered through conduit 87 the space 88 at the left of piston 63 (FIG. 8), but its pressure has been balanced by a compression spring 90 engaging the valve casing wall and the piston 66. That spring is selected to balance the valve stem 60 only while the pressure in the piston chamber is sub-normal, but when the air pressure reaches the maximum in space 88, it serves to move the valve stem 60 to the right and so arranges the valve pistons in the positions shown in FIG. 9. Previously, air in passage 92 has had its pressure balanced against the pistons 61 and 62 (smaller than the intermediate pistons 63 to 66), and it has left the valve stem 60 in the position of FIG. 8. But when the stem is moved to the right by the pressure in chamber 88, then, as shown in FIG. 9, the air pressure on the left side of piston 61 in chamber 93 serves to hold the stem temporarily in that position, since the full air pressure is stronger than the spring 90.

In the new valve position (FIGS. 1 and 9), the air entering compartment 80 passes through passage 97 into a third bore 95 (FIGS. 1 and 12) parallel with bores 72 and 84 and then through duct 94 into the piston chamber 96 at the right of piston 17. This, therefore, serves to return the piston 17 toward the left. A side conduit 100 (FIG. 9) communicates the fluid pressure from conduit 95 to the space between the pistons 67 and 68, but these small pistons, being of the same size and equal to pistons 61 and 62, are balanced and the fluid pressure does not effect any movement of the valve stem. Hence, air from the valve passage 72 has access to the tool piston chamber 96 until the operator releases the button 76 of the manual control. Thereupon, the spring 90 thrusts the valve stem 60 toward the left and the mechanism is ready for the next cycle. It will be observed by reference to FIG. 8 that when the valve parts are in the positions there shown, the various compartments at the right hand side of the valve and the piston space 96 are open to the atmosphere through an exit conduit 105, so that the piston may readily move without back air pressure. This bleed-off conduit 105 in the valve stem position of FIG. 9 communicates through the compartment 86 with the conduit 84 and piston space 85 to prevent back pressure on the piston. In the valve position of FIG. 8 the space 96 is open to the outlet.

Hence, while the operator holds down on the manual control button 76, the tool will run through its cycle of spreading the jaw levers 11 to clinch the ring, after which the jaw levers are automatically returned toward the left for a further ring receiving operation. If the operator should accidentally withdraw his finger from the control button 76 before this stage has been fully accomplished and before a second ring has been picked up by the jaws, then it is merely necessary for him to press the button 76 again and cause the tool to go through its cycle but without carrying a ring forward. That is, this accidental and improper operation cannot result in two rings being positioned in the jaws at the same time. As soon as the new ring has been picked up, the jaws, while being moved to the left, will locate the ring in position B (FIG. 6). Thereafter, movement of the jaws towards the right will position the ring for insertion into the work.

A primary feature of this invention pertains to urging the piston forward under a yielding pressure which causes the jaws initially to clamp against a ring with sufficient force to remove it from the magazine stack and carry the ring to position B but without clinching it. This happens after the air valve button 76 (FIG. 2) has been released and the air in the piston casing chamber 85 has been bled to the atmosphere (FIG. 9). This yielding action is effected in accordance with the showing of FIGS. 1, 8 and 9 by means of a spring 110 located in the rear compartment 85 of the main piston chamber. This helical spring is so constructed that it applies a force against the piston 17 tending to move it toward the right with a comparatively gentle urging pressure. This force is sufficient to move the wedge block 42 far enough to hold the jaws in a firm clamping engagement against the C-ring when the jaws are in the retracted position of FIG. 5 and then carry the ring forward until the cross piece 21 on slide 22 strikes the plate 25. Hence, while the air pressure is off, the spring 110 moves the wedging cam 42 toward the right to pry between the lever ends 43 and thus urge the jaws into a firm but resiliently applied contact with the end C-ring of the magazine supply. As above stated, the ring has been positioned in the ends of the jaws by the dragging movement of the jaws over the ring when moved towards the left. The ring is held in the jaw ends while the device is idle, and the further movement of the jaws by the air pressure is to clinch the ring. That spring 110 is so sized and constructed that it will move the piston 17 only to the intermediate position of presenting the ring for insertion into the work, but the stronger force of the air pressure is required to clinch the ring. When the jaw lever movement towards the right is stopped by the plate 25, nothing further happens until the operator applies the air pressure. This movement of the cam by the spring meets no resistance except friction, so that the forward motion is transmitted through pivots 12 to move the slide block 22 until it strikes the plate 25. The piston 17 and the slide 21 are moved by spring 110 through the same distance X, as shown in FIG. 1, so that the piston remains in an intermediate position while the tool is idle. The spring 110 is too weak to clinch the ring but it is strong enough to hold the ring firmly in the jaws while the tool is otherwise inoperative.

Various other means may be employed to insure this forward motion of the piston 17 for feeding and holding the C-ring in the jaws prior to the clinching action. In FIG. 14, I have illustrated a construction wherein this feeding and holding the C-ring is caused by means of fluid under a controlled pressure lower than needed to clinch the ring. This lower fluid pressure may be provided from a supplemental air line, but I prefer to derive it from the same air source used to clinch the ring but to pass it through a pressure reducing valve which operates automatically. As shown diagrammatically, this comprises a four-way valve and a pressure reduction valve, both of suitable construction. The air under pressure enters the inlet pipe 120 which communicates suitably with the above described conduit 72. The four-way valve has a cylindrical chamber and a valve stem 121 slidable therein, provided with a pair of suitably sealed pistons 122 and 123 of the same size which normally are held in a balanced position by the air from conduit 120 entering the space therebetween. The valve stem 121 is urged toward the right by a helical compression spring 124, and the valve remains in this normally open position until the valve stem button 125 is manually depressed to transfer the air from the chamber 126 to a high pressure conduit 127 which by-passes the pressure reduction part and goes directly to the chamber 80 of the main valve (FIG. 1) and thence to the piston casing 16 which has no spring 110 therein, as shown in FIG. 10. This valve and associated parts replaces the control valve 74 of FIG. 2. The operation when the valve stem 121 is substantially depressed is the same as above described.

Normally, the spring 124 holds this four-way valve open and air under the full pressure from conduit 120 passes through the valve into the compartment 128 in the pressure reduction valve system. Here the air passes between a conical valve 130 and its valve seat when the passage is open. The lower end of the valve stem 131 is connected by a rod to a diaphragm 132 in a space beneath the compartment 128. The air under pressure is admitted past the valve 130 to the space 134 where it passes through a suitable port into the space 135 above the diaphragm. A helical compression spring 136 suitably mounted beneath the diaphragm has its pressure adjusted by means of the screw threaded pin 138 bearing against a plate 139 which supports the lower end of the spring, so that moving the plate 139 upwardly increases the pressure on the diaphragm 132. A small coiled spring 140 tends to close the valve 130 against its seat, but it is weaker than the diaphragm spring 136. The space 134 communicates with an exit pipe 142 which leads to the passage 80 in the main valve. A normally open check valve 143 is interposed between the passages 134 and 142 and a weak spring 144 normally closes that passage when the air pressure in the compartment 134 has been decreased, thus preventing air under pressure from escaping back through the pressure reduction valve. A similar check valve is mounted at 145 in the high pressure line 127. The passages 146 in the handle are for the escape of air at the opposite ends of the valve stem 121.

The operation of this pressure reducing device, which may be one of various types well known in the industry, is such that when the full air pressure in space 128 reaches the top of the diaphragm 132, the valve 130 is lowered by spring 140 and closes the air passage. Then as the air pressure in the space 135 decreases, the spring 136 takes over and again moves the diaphragm and valve 130 upwardly to admit air again. This results in a rapid pulsating action which serves to reduce the pressure issuing into pipe 142. Thus, when the main valve stem 60, which controls the air to the main piston chamber 85, is in the position shown in FIGS. 8 and 14, air is introduced to the space 85 through the passage 82 into the air cylinder 16 and serves to move the piston 17 toward the right. However, this reduced air pressure has been so regulated by manipulation of the spring tensioning stem 138 that the piston 17 can go forward only partway until the slide 22 reaches the stop plate 25 where the ring 14 is in the outwardly projecting position B of FIG. 6. That reduced air pressure is insufficient to swing the jaws and clinch the ring. Thus the ring is held normally in a projecting position ready for insertion into the work, until the operator presses on the valve button 125 and causes the air to by-pass the pressure reducing apparatus and go through the high pressure line 127 into the main valve passage 80.

It will be appreciated that other forms of jaw operating mechanism may be employed, such as the toggle linkage shown in FIG. 15. This toggle linkage replaces the cam 42 in a construction which may be otherwise the same as above described, and it is mounted to be operated by the forward movement of the piston 18. As indicated, the toggle linkage comprises two levers 120 having C-ring holding jaws at their outer ends and which are pivotally mounted at 121 on the cross member 21 of the slide 22 (FIG. 3). These jaw levers are pivotally connected to short links 122 through suitable pivots 124. A common pivot 125 for these links 122 is attached to the block 126, corresponding with the block 44 above described, which is suitably attached to the piston rod 18. When the spring 110 causes the piston 18 to move forward toward the right, the jaw levers 120 move therewith until their supporting slide 22 reaches the stop plate 25. (FIG. 3). This forward movement causes the jaws on the ends of the levers 120 to grip a ring at the top of magazine and move it outwardly without clinching it. When air is applied to move the piston rod 18 further forward, this serves through the toggle linkage to clinch the ring.

The operation of the device has been fully set forth above. A ring remains normally projecting from the jaws while the tool is idle (FIG. 6). The first step, therefore, is for the operator to insert the ring into the workpiece and then press the valve trigger, which sends the high pressure air directly into the chamber 85 at the left of the piston. Since the piston is in an intermediate but forward position, only a further slight movement is required to drive the wedge or cam 42 far enough to spread the jaw levers mounted on the now stationary slide 22 (FIG. 7) and thus clinch the ring. During that forward movement of the piston, the air pressure is sub-normal, but it quickly attains a maximum at the end of the piston stroke, whereupon the slide valve 60 is reversed to introduce the air into the forward compartment 96 and return the piston 17 throughout the entire stroke to the left. During this return stroke, the jaws drag over a new ring in the slot 31 and far enough to cause the ring to pass over the shoulder 37 to the groove 34, 38 and then lie in front of that shoulder. This serves to position a ring in the jaws while the ring remains stationary in the slot 31. When the operator releases the air valve trigger, the valve stem 60 then moves under the pressure of spring 90 to a position where the next admission of air will be into the rear chamber 85 of the piston casing. Since the piston chamber 96 is now open to the atmosphere through pipe 105 (FIG. 8), there is no back resistance on the piston and the spring 110 immediately thrusts the piston forward and moves the jaws to carry a ring 14 from position A to position B of FIG. 6. That is, the spring serves to withdraw the ring from the slot 31 by pushing it forward to position B where it remains while the tool is idle. The spring is too weak to clinch the ring and therefore the apparatus remains idle at this point until the operator again admits air to the chamber 85. It will be observed that the piston 17 has been made massive at the left hand portion surrounded by the spring 110 so that the minimum of air volume is required to move the piston the further short distance needed to clinch the ring.

The various cycles of tool operation may be briefly restated as follows:

(a) When the tool is at rest with a ring projecting from the jaws (FIGS. 7 and 8) air is introduced into the left hand piston chamber 85, and since the jaws and ring are in the position B of FIG. 7, the air pressure on piston 17 causes the wedge block 42 to spread the jaw lever ends 43 and clinch the ring. Since the cross piece 21 of the slide 22 is at that time held by spring 110 in engagement with the rear of the nose piece 25 of the tool, the wedge block 42 must rotate the jaw levers and close the ring.

(b) The piston movement results in a lowered air pressure in the air ducts, and the valve spring 90 holds the reversing valve in the position of FIG. 8 until the piston 17 stops.

(c) When the piston 17 stops at the right hand end of its travel, the increased air pressure in compartment 88 of the reversing valve thrusts the valve stem 60 toward the right to the position of FIG. 9 and against the pressure of the weak spring 90.

(d) In the new valve position of FIG. 9, the piston 17 is then driven toward the left and carries, through the yielding action of spring 50, the slide 22, 48. This causes the pivots 12 of the jaw levers to drag the jaws over the new ring 14 held stationary by stop 36 at the top of the magazine supply until the ring is positioned in the ends of the jaws.

(e) The valve stem 60 remains in the position of FIG. 9 while the operator holds the air valve open. When he releases the valve button, the compressed spring 90 of FIG. 9 thrusts the valve stem 60 toward the left into the position of FIGS. 1 and 8 and the valve stem system is now ready for introducing air into the compartment 85.

(f) When the air pressure in the right hand piston chamber 96 has been exhausted through the outlet pipe system 100, 105 (FIG. 8) the spring 110 in the left hand piston chamber 85 thrusts the piston 17 towards the right until the cross piece 21 on slide 22 (FIG. 3) strikes the rear face of the fixed plate 25. The spring 110 is not strong enough to clinch the ring 14 which has been carried from the top of the magazine to a position of projecting outwardly at the front end of the tool. This operation serves merely to present a ring in a projecting position at the front end of the tool and while the tool is at rest the tool parts remain in the positions of FIGS. 6 and 8. The reduced air pressure system of FIG. 14 acts to the same effect as spring 110, as above explained. In this modification, the valve and the piston casings are the same as shown in FIGS. 1 to 13, except that the spring 110 is absent. Hence when the operator releases the valve button 125 after a new ring has been picked up, the reduction pressure mechanism operates to send air into chamber 85 under such a low pressure as to move the piston 17 forward only through the distance X (FIG. 1) to present the new ring at the front of the jaws. This is the condition while the tool is idle but connected to the air supply through the duct 129.

It will now be apparent that various modifications may be made in this construction and that the preferred embodiments herein described are not to be interpreted as imposing limitations on the appended claims.

I claim:

1. A power operated C-ring clinching tool comprising a frame, a pair of pivoted jaws mounted thereon for movement longitudinally of the frame between ring receiving and clinching positions, a magazine for supplying a ring to the jaws when in said receiving position, a piston chamber and a piston therein, means connecting said piston with the jaws to reciprocate the jaws in opposite directions, said jaws being arranged to drag over a ring in said magazine and grasp it and then to transport the ring to a clinching position, means including a stop which causes the piston movement in a forward direction to swing the jaws and clinch the ring therein, and a manually controlled, automatically operated reversing valve mechanism connected for introducing fluid under pressure alternately at opposite sides of the piston to reciprocate the piston and jaws positively, said valve mechanism embodying means for moving the piston rearwardly when the ring has been clinched and causing the jaws to drag positively over an exposed ring in the magazine to lodge the ring therein and thereafter moving the piston forward to clinch a new ring in the jaws.

2. A tool according to claim 1 comprising means, acting when the fluid pressure has been shut off, to move the jaws forward and present a ring in the clinching position without clinching the ring.

3. A power operated C-ring clinching tool comprising a frame, a pair of pivoted levers having jaws on their ends, means for mounting the levers on the frame for reciprocating the jaws between ring receiving and clinching positions, a magazine for supplying a ring to the jaws in the receiving position, a fluid pressure operated piston, means including a cam associated with the piston to move the levers longitudinally and pivotally close the jaws as the piston moves in one direction and to permit the jaws to open at the reverse direction piston movement for receiving another ring, valve mechanism governing the fluid pressure to control the piston movement and cause its reciprocation in both directions, and means acting when the fluid pressure has been shut off to move the jaws forward and present a ring in the clinching position without clinching the ring.

4. A power operated C-ring clinching tool comprising a frame, a pair of pivoted jaws thereon which are movable longitudinally of the frame from a ring receiving to a clinching position, means for supplying a ring to the jaws in their receiving position, means including a fluid pressure operated piston for pivotally moving the jaws to clinch a ring therein, means including a manually controlled valve to introduce fluid under pressure to move the piston, and supplemental means for moving the jaws from the ring receiving to a clinching position and cause the jaws to clamp yieldingly against a ring without clinching it when the valve is released.

5. A tool according to claim 4 in which the supplemental means comprises a spring which moves the jaws to the clinching position.

6. A tool according to claim 4 in which said supplemental means comprises valve mechanism for admitting fluid to the piston chamber at a lower pressure than that required to clinch the ring.

7. A power operated C-ring clinching tool comprising a frame, a slide longitudinally movable thereon, a pair of ring carrying and clinching jaws pivotally mounted on the slide which are movable with the slide between ring receiving and clinching positions, a magazine for supplying a ring to the jaws when they are in a receiving position, a fluid pressure operated piston, a cam associated with the piston which causes forward movement of the piston to swing the jaws and clinch a ring therein, supplemental means for moving the jaws forward and causing the jaws to grip a ring yieldingly and remove it from the magazine and transport it to the clinching position without clinching the ring, and manually controlled valve mechanism to cause fluid pressure against the piston to clinch the ring and return the piston to an initial position.

8. A power operated C-ring clinching tool comprising a frame, a slide movable longitudinally of the frame, a pair of jaw levers pivotally mounted on and movable with the slide, ring clinching jaws on the levers movable longitudinally of the frame between ring receiving and clinching positions, a magazine for supplying a ring to the jaws in their ring receiving position, a fluid pressure operated reciprocable piston, means including a cam whereby forward movement of the piston causes said jaws to pivot and clinch a ring therein, means for causing the jaws to grip a ring yieldingly and move it forward to a clinching position and manually controlled valve mechanism to cause the piston to move and the jaws to clinch a ring.

9. A power operated C-ring clinching tool comprising a frame, a slide movable longitudinally thereon, a pair of levers pivoted on the slide and having jaws movable between ring receiving and clinching positions, a magazine to supply a ring to the jaws in their receiving position, a fluid pressure operated piston, a manually controlled valve for introducing fluid under pressure to move the piston, an automatically acting reversing valve mechanism for introducing the fluid at opposite sides of the piston to reciprocate it in opposite directions, means associated with a rearward piston movement which causes the jaws to drag yieldingly over a ring in the receiving position and lodge the ring in the forward ends of the jaws, a stop for limiting the forward movement of the slide, separate means acting when said valve serves to cut off the fluid supply which causes the slide to move forward into engagement with the stop without clinching the ring, and said valve mechanism serving, when fluid under pressure is again introduced in said valve and while the slide engages said stop, to move the jaws to clinch the ring therein.

10. A tool according to claim 9 wherein the valve mechanism comprises a valve casing and a set of pistons and conduits therein arranged to introduce fluid under pressure successively to opposite sides of the jaw actuating piston, and means whereby said valve pistons remain under a balanced pressure in a position for causing the jaw actuating piston to move to an end position and cause the ring to be clinched, whereupon the pressure increases in the valve casing to a maximum, and means whereby the increased pressure causes movement of the valve pistons to introduce fluid to the opposite side of the jaw piston and return the jaws to a work receiving position after a ring has been clinched.

11. A power operated C-ring clinching tool comprising two longitudinally movable pivoted jaws, a fluid pressure chamber having a jaw operating piston therein, means whereby movement of the piston moves the jaws longitudinally and clinches a ring therein, a slide valve comprising a stem carrying pistons defining spaced compartments, conduits connecting the compartments with opposite sides of the jaw operating piston, one conduit serving for an initial position of the valve stem to introduce fluid to move the jaw piston to clinch a ring, a spring adjusted to resist movement of the valve stem until the jaw piston has reached an end position and the fluid pressure thereon has increased to a maximum value, a conduit connected to introduce the increased pressure to a valve stem chamber and move the stem to introduce fluid to the opposite side of the jaw actuating piston and return it to an initial position, and a manually operated valve to shut off the fluid supply and permit said spring to return the stem to reverse the fluid flow of the valve.

12. A power operated C-ring clinching tool comprising a pair of reciprocable, pivotally mounted levers having ring clinching jaws at their ends, a fluid pressure operated piston, means including an automatically acting reversing mechanism for introducing fluid alternately at both sides of the piston to move it positively in opposite directions, a magazine for presenting a ring to the jaws in a rear receiving position, means whereby the piston movement in a rearward direction causes the jaws to drag over a ring in the magazine and position the ring at the front of the jaws for clinching, a spring associated with the jaws which permits them to pivotally disengage from a clinched ring and to engage the magazine ring yieldingly, and means associated with the piston whereby movement of the piston in a forward direction causes the ring to be clinched.

13. A tool according to claim 10 comprising a slide on which the jaws are pivotally mounted, a piston rod moved by the piston which has a head thereon, said spring being located between the slide and the piston rod head and arranged for yielding urging the slide rearwardly, and separate means to move the slide forward.

14. A power operated C-ring clinching tool comprising a pair of pivoted jaws movable longitudinally between ring receiving and clinching positions and pivotally to clinch a ring, a magazine for supplying a ring to the jaws in the receiving positon, said jaws having opposed ring gripping faces, a fluid presure operated piston, a cam moved by the piston which is connected to move the jaws pivotally and clinch a ring between said faces, a stop for limiting the longitudinal movement of the jaws to the clinching position, a spring connected to move the cam and cause the jaws to transport a ring to the clinching posiion as determined by said stop, an automatically reversing valve mechanism to cause fluid under pressure to move the piston and the cam further to clinch a ring in the jaws and then return the jaws to a ring receiving position, a manually operated control valve to disconnect the fluid pressure from the valve mechanism, said spring operating thereafter to move the jaws and ring to the clinching position, and resilient means associated with the jaws which provides for separation of the jaws for removal of the clinched ring from said faces.

15. A power operated C-ring clinching tool comprising a frame, a pair of pivoted levers having jaws movable on the frame between ring receiving and clinching positions, a magazine for supplying rings serially to the jaws in their receiving positions, the jaws having opposed front ring holding grooves and rear supports with inwardly projecting humps intermediate thereof which form shoulders for resisting rearward movement of the ring during clinching thereof, said supports at the rear of the humps carrying the end ring in the magazine during a ring clinching operation and being so arranged that rearward movement of the jaws forces the hump over the supported ring and lodges the ring in a clinching position, a stop which prevents movement of the magazine ring during rearward movement of the jaws, a spring providing for the jaws opening when the hump moves over the magazine ring, and means for moving the piston and the jaws between said positions and causing the jaws to clinch a ring.

16. A power operated C-ring clinching tool comprising a frame, a pair of pivoted jaws mounted thereon for longitudinal movement between ring receiving and clinching positions, a fluid pressure actuated piston, means connecting the piston with the jaws for moving them between said positions and for pivotally moving the jaws to clinch a ring, means for moving the piston to an intermediate position to locate the jaws in a ring clinching position, and fluid pressure controlling valve mechanism to cause further movement of the piston to clinch a ring in the jaws.

17. A power operated C-ring clinching tool comprising a frame, a pair of jaws mounted thereon for longitudinal movement between ring receiving and clinching positions and for pivotal movement to clinch a ring, a magazine for supplying a ring to the jaws in a receiving position, a reciprocable piston, means connecting the piston with the jaws to provide said movements, means for moving the piston only to an intermediate point to locate the jaws in a clinching position and there remain inoperative, and means including manually controlled valve mechanism which causes fluid pressure to move the piston to the end of its travel and clinch a ring and then return the jaws to a ring receiving position.

References Cited in the file of this patent

UNITED STATES PATENTS

| | | |
|---|---|---|
| 2,325,322 | Jackson | July 27, 1943 |
| 2,487,475 | Powers | Nov. 8, 1949 |
| 2,605,467 | Lind | Aug. 5, 1952 |